(12) United States Patent
Hesselbarth

(10) Patent No.: US 12,454,355 B2
(45) Date of Patent: Oct. 28, 2025

(54) DEVICE FOR ALIGNING A PIECE GOOD PART LIFTED BY MEANS OF A WINCH OF AN AIRCRAFT

(71) Applicant: Wingcopter GmbH, Weiterstadt (DE)

(72) Inventor: Jonathan Hesselbarth, Darmstadt (DE)

(73) Assignee: Wingcopter GmbH, Weiterstadt (DE)

( * ) Notice: Subject to any disclaimer, the term of this patent is extended or adjusted under 35 U.S.C. 154(b) by 174 days.

(21) Appl. No.: 18/033,272

(22) PCT Filed: Oct. 25, 2021

(86) PCT No.: PCT/EP2021/079499
§ 371 (c)(1),
(2) Date: Jul. 19, 2023

(87) PCT Pub. No.: WO2022/084553
PCT Pub. Date: Apr. 28, 2022

(65) Prior Publication Data
US 2023/0391450 A1    Dec. 7, 2023

(30) Foreign Application Priority Data

Oct. 23, 2020   (DE) ............... 10 2020 127 986.8

(51) Int. Cl.
*B64D 1/22* (2006.01)
*B64C 1/22* (2006.01)
*B66D 1/38* (2006.01)

(52) U.S. Cl.
CPC ............. *B64D 1/22* (2013.01); *B64C 1/22* (2013.01); *B66D 1/38* (2013.01)

(58) Field of Classification Search
CPC ............. B64D 1/22; B64C 1/22; B66D 1/38
See application file for complete search history.

(56) References Cited

U.S. PATENT DOCUMENTS 2,732,246 A    1/1956  Bernhart
3,330,509 A *  7/1967  Barchet ............... B64C 1/22
                                                    244/1 R (Continued)

FOREIGN PATENT DOCUMENTS

DE    102015120766 A1 *  6/2017
EP    2699471 A1          10/2012

OTHER PUBLICATIONS

Translation of DE-102015120766-A1 (Year: 2017).*

*Primary Examiner* — William L Gmoser
(74) *Attorney, Agent, or Firm* — Smartpat PLC

(57) ABSTRACT

An alignment device aligns a piece good part, which is received by a cable winch, relative to a yaw axis of an aircraft. An alignment member is fastened on an underside of the aircraft, and an alignment mating part fixed to the piece good part. In use, the alignment mating part has an alignment lug pointing towards the aircraft. The alignment member has a guide track having a sliding surface facing the alignment mating part. When the alignment mating part is displaced towards the aircraft, the alignment lug of the alignment mating part abuts the sliding surface through retraction of the cable winch. During further axial displacement of the alignment mating part towards the aircraft, through further retraction of the cable winch, the alignment lug slides along the sliding surface. This causes the alignment mating part to rotate and align the piece good part with the aircraft.

13 Claims, 3 Drawing Sheets

(56) References Cited

U.S. PATENT DOCUMENTS

| | | | | |
|---|---|---|---|---|
| 3,554,468 | A * | 1/1971 | McVicar | B64D 1/22 |
| | | | | 294/81.1 |
| 3,666,216 | A * | 5/1972 | Nagy | B63G 8/42 |
| | | | | 244/172.4 |
| 3,810,671 | A * | 5/1974 | Jeffery | B64D 1/22 |
| | | | | 294/82.32 |
| 4,893,767 | A * | 1/1990 | Ferraro | B64C 1/22 |
| | | | | 254/323 |
| 5,208,724 | A * | 5/1993 | Honigsbaum | H05F 3/02 |
| | | | | 239/171 |
| 5,927,649 | A * | 7/1999 | Nykiforuk | B64D 1/22 |
| | | | | 294/82.26 |
| 7,946,530 | B1 * | 5/2011 | Talmage, Jr. | B64C 27/006 |
| | | | | 244/140 |
| 8,534,608 | B1 * | 9/2013 | Cox, IV | A01G 23/095 |
| | | | | 244/137.4 |
| 10,301,024 | B1 * | 5/2019 | Sopper | B64D 1/22 |
| 2017/0253334 | A1 | 9/2017 | Takayama et al. | |
| 2018/0072417 | A1 | 3/2018 | Shannon et al. | |
| 2020/0062399 | A1 | 2/2020 | Prager et al. | |
| 2020/0207474 | A1 * | 7/2020 | Foggia | G05D 1/0676 |
| 2023/0192297 | A1 * | 6/2023 | Prager | B66C 1/34 |
| | | | | 244/118.1 |

* cited by examiner

DEVICE FOR ALIGNING A PIECE GOOD PART LIFTED BY MEANS OF A WINCH OF AN AIRCRAFT

CROSS-REFERENCE TO RELATED APPLICATION

This application is a national stage application, filed under 35 U.S.C. § 371, of International Patent Application PCT/EP2021/079499 filed on Oct. 25, 2021, which claims the benefit of German Patent Application DE 10 2020 127 986.8 filed on Oct. 23, 2020.

TECHNICAL FIELD

The disclosure relates to an alignment device for aligning a piece good part, received by means of a cable winch of an aircraft, about a rotational axis which is in parallel with the yaw axis of the aircraft when the alignment device is used as intended.

BACKGROUND

Nowadays, vertically starting aircraft, for example what are known as quadrocopters, are used as aircraft for transporting piece goods. A quadrocopter is an aircraft in which four rotors or propellers, arranged in a plane and acting perpendicularly downwards, are used to generate lift. The propulsion of the quadrocopter is produced by an inclination of the rotor plane. Said aircraft can transport a certain payload over a particular distance, depending on the drive power. The range is limited according to the available battery capacity, depending on the drive power and depending on the received payload.

Aircraft are known from the prior art which are equipped with a cable winch by means of which piece good parts can be received. The loading or unloading of the aircraft typically takes place in that the cable winch is lowered as far as the loading site or unloading site, respectively, and the piece good part is fastened by means of a receiving device attached to an end of the cable of the cable winch. In this case, the receiving device can be designed for example as a hook, an eye, or a magnet. The fastening of the piece good part to the receiving device of the cable winch is usually achieved in a manual step by an operator standing on the ground. Subsequently, the piece good part is raised, by means of the cable winch, as far as a position close to the underside of the aircraft, in which position it also remains during flight operation. In this case, the piece good part suspended on the cable winch can be set into an oscillating motion and swing upwards during flight operation, on account of lateral or frontal wind gusts. This results in an unstable flight attitude of the aircraft.

Since the piece good part generally hangs freely on the cable winch of the aircraft during flight operation, during the flight movement a piece good part is usually aligned such that the side face having the largest surface subjected to incident flow is facing in the direction of the flight movement or in the direction of the incident flow. Thus, in particular an elongate piece good part turns out in the direction of the flight movement, during flight operation. As a result, a very high air resistance in the flight direction is generated during flight operation. This results in a high energy consumption during flight operation. This results directly in a shorter flight duration on account of the limited battery capacity, and thus furthermore a short flight distance.

As described above, on account of the suspended fastening of the piece good part to the cable winch of the aircraft, the orientation of the piece good part during loading, during flight operation, and during unloading, can change and differ. Thus, the space requirement for unloading the piece good part by lowering the cable winch has to be assessed again, since the space requirement for the unloading may have changed compared with the space requirement during loading. Such control and assessment of the space requirement available can result in a time-consuming receiving and/or unloading process. In particular in view of the limited flight duration of such aircraft, on account of the limited battery capacity, a time-consuming receiving and unloading process can lead to a reduced remaining flight time, and thus reduce the range for the transport of the piece good part.

SUMMARY

The object of the present disclosure is considered to be that of providing an alignment device for aligning a piece good part, received by means of a cable winch of an aircraft, about a rotational axis which is in parallel with the yaw axis of the aircraft when the alignment device is used as intended, in such a way that the piece good part can be aligned relative to the aircraft.

This object is achieved by an alignment device, wherein the alignment device has an alignment member which can be fastened on an underside of the aircraft, and an alignment mating part which can be fixed to a piece good part, wherein, when the alignment device is used as intended, the alignment mating part has an alignment lug pointing in a direction of the aircraft, wherein the alignment member has a guide track, wherein a sliding surface of the guide track is oriented in the direction of the alignment mating part, wherein, when the alignment mating part is displaced in the direction of the aircraft, the alignment lug of the alignment mating part is brought into abutment with the sliding surface through retraction of the cable winch and, in the event of a further axial displacement of the alignment mating part in the direction of the aircraft along the rotational axis, through further retraction of the cable winch the alignment lug slides along on the sliding surface and brings about a rotation of the alignment mating part about the rotational axis, such that the piece good part can be aligned relative to the aircraft. Since an alignment of the piece good part can be carried out exclusively by retracting the cable winch, no complex, and thus possibly fault-prone, control or communications means are required. As a result, the alignment device can be produced in a particularly cost-effective manner.

Since the piece good part can be aligned relative to the aircraft, a preferred direction of the piece good part relative to the aircraft can be set. Thus, the air resistance in flight operation in the direction of the flight movement can be set particularly advantageously, and the lowest possible air resistance can be achieved. Thus, a particularly energy-saving flight operation can take place, such that a long remaining flight time of the aircraft and thus a long flight distance is available.

In an advantageous implementation, it is provided that the sliding surface of the guide track is designed such that it has a gradient angle, at least in portions, wherein the gradient angle is specified by a normal axis, oriented perpendicularly to the sliding surface and the rotational axis. The design of the sliding surface having a gradient angle makes it possible for the direction and the magnitude of the alignment movement of the piece good part to be set particularly advantageously. In order that the rotation of the alignment mating part about the rotational axis, or the rotation of the piece good part about the rotational axis, can be set particularly well, and can take place about a particularly large rotation angle, it is provided, in an advantageous embodiment of the alignment device, that a progression of the gradient angle along the guide track is continuous.

A continuous gradient of the sliding surface can particularly advantageously be implemented in that the guide track extends helically around a longitudinal axis of the alignment member extending in parallel with the yaw axis of the aircraft. The rotational axis about which the alignment mating part or the piece good part rotates in the case of retraction of the cable winch can correspond to the longitudinal axis of the alignment member.

In order that a rotation of the alignment mating part or of the piece good part in a preferred direction can take place, it is provided, in an advantageous implementation, that the guide track extends helically around the longitudinal axis of the alignment member, about an angle of 360 degrees. Since the guide track executes a complete rotation about 360 degrees, around the longitudinal axis of the alignment member, advantageously no particular alignment of the alignment mating part is required.

Irrespective of the region of the alignment mating part with which the sliding surface is brought into abutment when the cable winch is retracted, in the case of a further retraction of the cable winch, the alignment lug can slide along the sliding surface, and the alignment mating part or the piece good part can be rotated into a position or orientation defined by the end of the guide track that is rotated about 360 degrees. Thus, a clear and defined alignment of the piece good part can particularly advantageously take place.

In order to transfer the piece good part into the desired alignment orientation having the shortest possible rotation path, it is provided that the guide track comprises at least two guide track portions, wherein the guide track portions extend helically and in opposite directions around the longitudinal axis of the alignment member. In this case, the alignment mating part or the piece good part is also brought into a position defined by the joining end regions of the two guide track portions. Thus, a clear and defined alignment of the piece good part can particularly advantageously take place.

In order to fix the piece good part particularly reliably in a desired alignment orientation, in an advantageous embodiment of the alignment device it is provided that the alignment lug can be fixed in a form-fitting manner on at least one of the guide track portions.

Form-fitting fixing of the alignment lug can be achieved particularly well in that the guide track of the alignment device comprises at least one recess arranged within the guide track, wherein the alignment lug can be arranged within the recess.

In order that a rotation of the alignment member is possible in a particularly energy-efficient manner and particularly easily, it is provided, in an advantageous implementation, that a lug surface of the alignment lug and/or of the sliding surface, which can be brought into abutment with the sliding surface, has a low coefficient of friction. A particularly low coefficient of friction of a friction surface pair can be achieved in that the materials or the surface properties are matched to one another. For example, a metal-metal friction surface pairing can have particularly low coefficients of friction. Alternatively, a plastics-metal friction surface pairing can be used, wherein for example the plastics material may be a PTFE plastics material. Or a plastics-plastics friction surface pairing is selected, wherein particularly good sliding is achieved in particular by PTFE on PTFE.

In an advantageous implementation, it is provided that the alignment mating part comprises a fastening device for fixing the alignment mating part to the piece good part. The alignment mating part can be fixed to the piece good part for example by means of a fastening device designed as staples or pins. Alternatively, the fastening device can be designed for example as a strap, through which package tape, a cable tie or a cable can be guided, such that the alignment mating part can be fixed to the piece good part. Alternatively, the fastening device can be designed as a hook-and-loop fastener, wherein one side of the hook-and-loop fastener is attached on the side of the alignment mating part, and the other side of the hook-and-loop fastener is attached on the piece good part.

In order that the alignment mating part and the piece good part fastened thereto can slide particularly well along the sliding surface of the guide track of the alignment member, irrespective of the shape and the outside dimensions of the piece good part, it is provided, in an advantageous embodiment of the alignment device, that the alignment lug is designed so as to protrude in a direction facing away from the piece good part.

In order that it is possible to prevent sagging of the piece good part fastened to the cable winch, after retraction of the cable winch by means of a drive motor of the cable winch, it can be provided for the cable winch to comprise a self-locking worm gear. It is thereby furthermore possible to ensure that the alignment lug, brought into abutment with the sliding surface, does not lose contact with the sliding surface, such that an alignment of the piece good part cannot be lost.

The object mentioned at the outset is achieved by an aircraft arrangement, wherein the aircraft arrangement comprises an aircraft and a piece good arranged on a cable winch of the aircraft, and an alignment device according to any of the preceding claims, wherein an alignment mating part of the alignment device, which is fixed to the piece good part, can be brought into engagement with an alignment member of the alignment device arranged on the underside of the aircraft, in the event of a displacement of the piece good in the direction of the aircraft.

Further advantageous embodiments of the alignment device are explained on the basis of embodiments shown in the drawings, in which:

DETAILED DESCRIPTION

Figure 1:
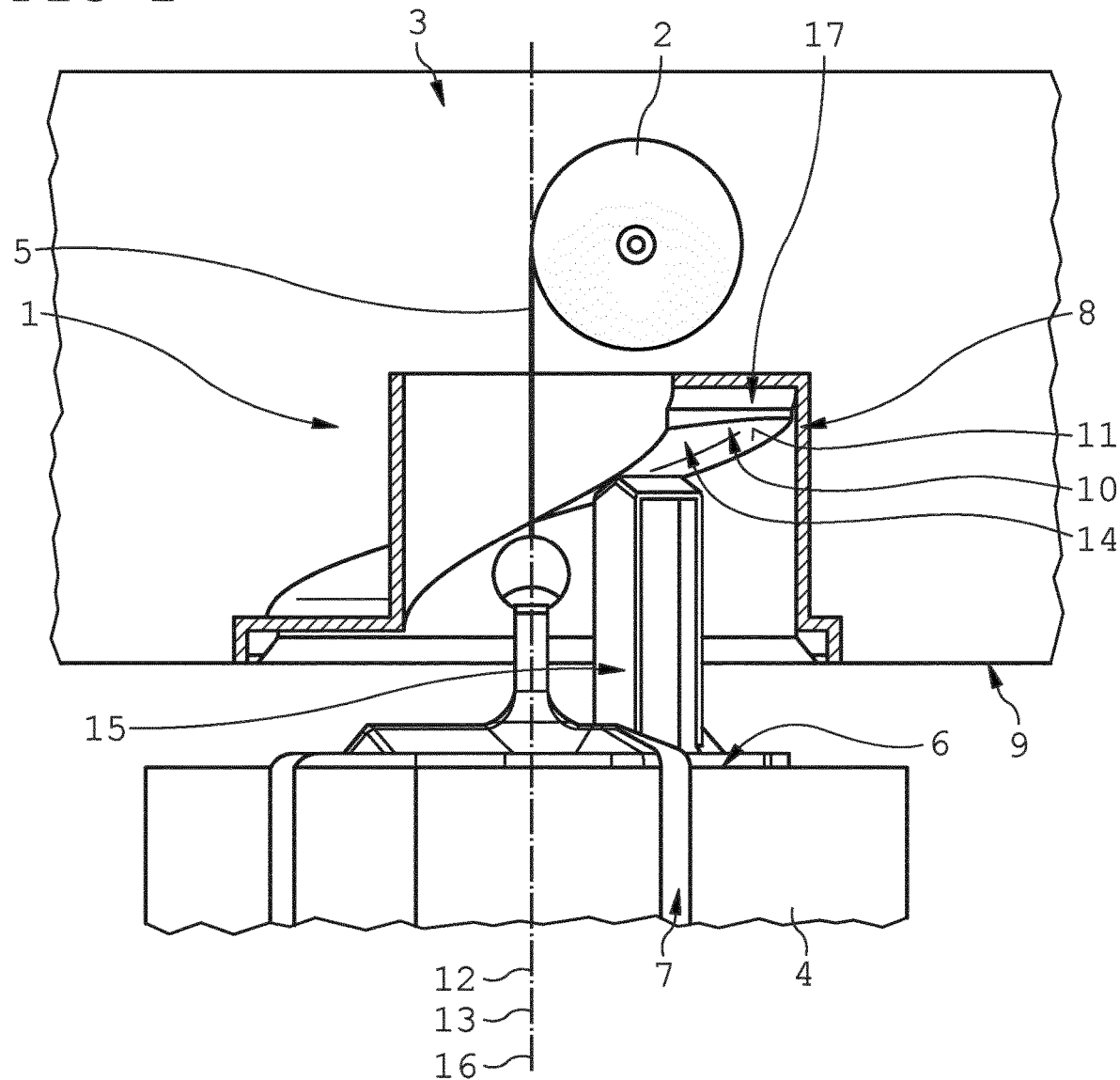
FIG. 1 is a schematic sectional view of the alignment device during the alignment process.

FIG. 1 is a schematic sectional view of an alignment device 1, during an alignment process of a piece good part 4 received by means of a cable winch 2 of an aircraft 3. An alignment mating part 6 is fastened to a cable 5 of the cable winch 2 by means of a gripper 18 shown in dashed lines in FIG. 2. The alignment mating part 6 of the alignment device 1 is fixed to the piece good part 4 via a fastening device 7 designed as a cable tie. An alignment member 8 of the alignment device 1 is fastened to an underside 9 of the aircraft 3. The alignment member 8 comprises a guide track 10 having a sliding surface 11 oriented in the direction of the alignment mating part 6. The guide track 10 extends helically around a longitudinal axis 13 of the alignment member 8 which extends in parallel with the yaw axis 12 of the aircraft 1. The guide track 10 comprises two guide track portions 14 which extend helically and in opposite directions around the longitudinal axis 13 of the alignment member 8, wherein just one guide track portion 14 is shown in FIG. 1. The alignment mating part 6 comprises an alignment lug 15 facing in the direction of the aircraft 3, which lug, in the embodiment shown, is brought into abutment with the sliding surface 11 of the guide track 10 by means of a retraction of the cable winch 2. By means of a further axial displacement of the alignment mating part 6 in the direction of the aircraft 3, along a rotational axis 16 in parallel with the longitudinal axis 13, by means of a further retraction of the cable winch 2, the alignment lug 15 slides along the sliding surface 11 and brings about a rotation of the alignment mating part 6 about the rotational axis 16, such that the piece good part 4 can be aligned relative to the aircraft 3.

Figure 2:
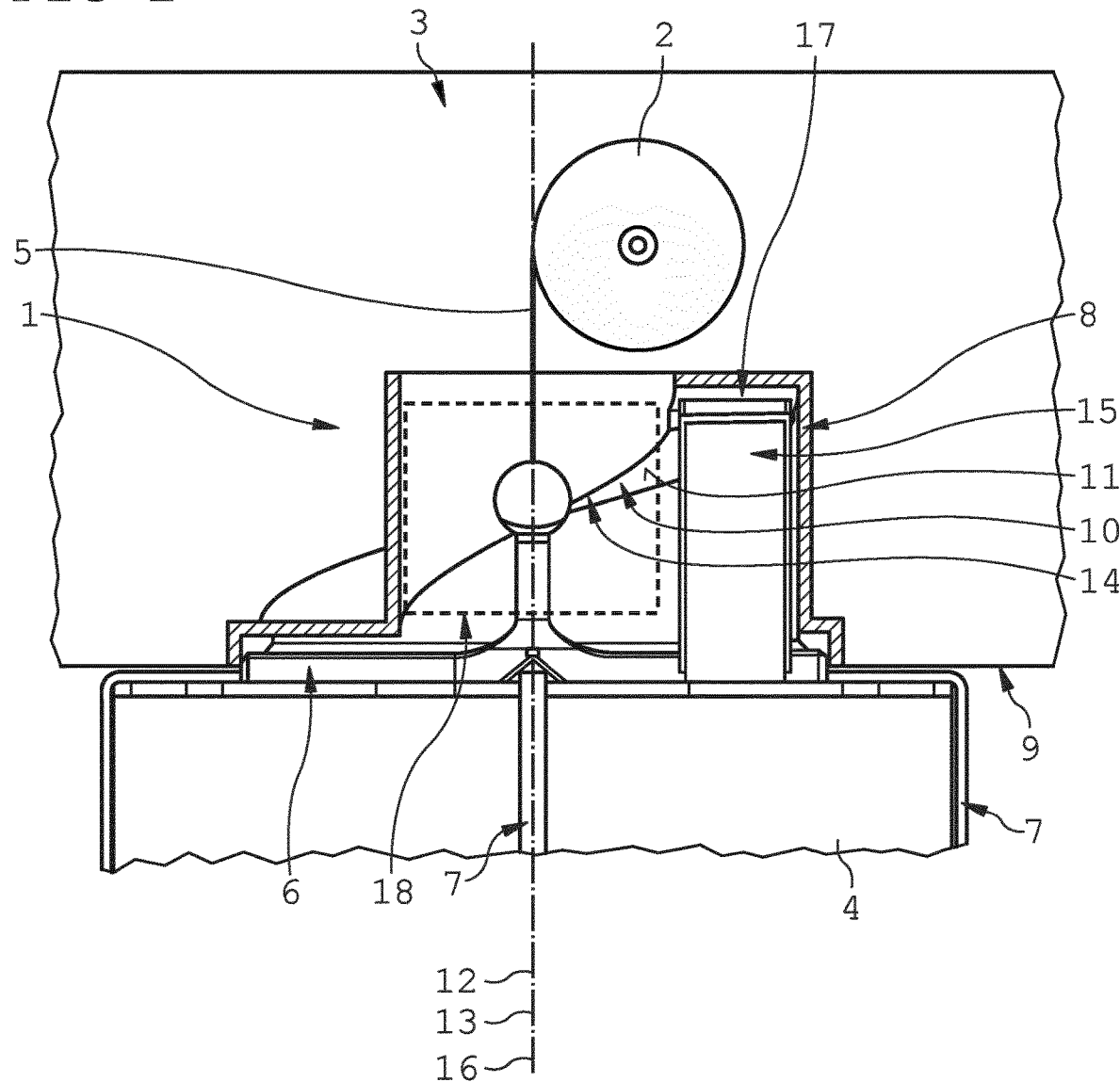
FIG. 2 is a schematic sectional view of the alignment device in an alignment of the alignment mating part that is fixed in a form-fitting manner.

A schematic sectional view of the alignment device 1 is shown in FIG. 2. The guide track 10 comprises a recess 17 arranged within the guide track 10. By means of the axial displacement of the alignment mating part 6 in the direction of the aircraft 3, along the rotational axis 16 by means of a further retraction of the cable winch 2, the alignment lug 15 slides along the sliding surface 11, such that the alignment lug 15 can be arranged within the recess 17 and the alignment mating part 6 is aligned and fixed in a form-fitting manner relative to the alignment member 8 and thus relative to the aircraft 3. In this case, a combined width specified by the gripper 6 and by the alignment lug 15 is greater than a maximum distance A, shown in FIG. 3, of a through-hole of the alignment member 8. As a result, the gripper 6 and the alignment mating part 6 cannot tilt and jam within the alignment member 8, in the event of possible tilting of the alignment mating part 6. This allows for a particularly reliable alignment process of the piece good part 4.

Figure 3:
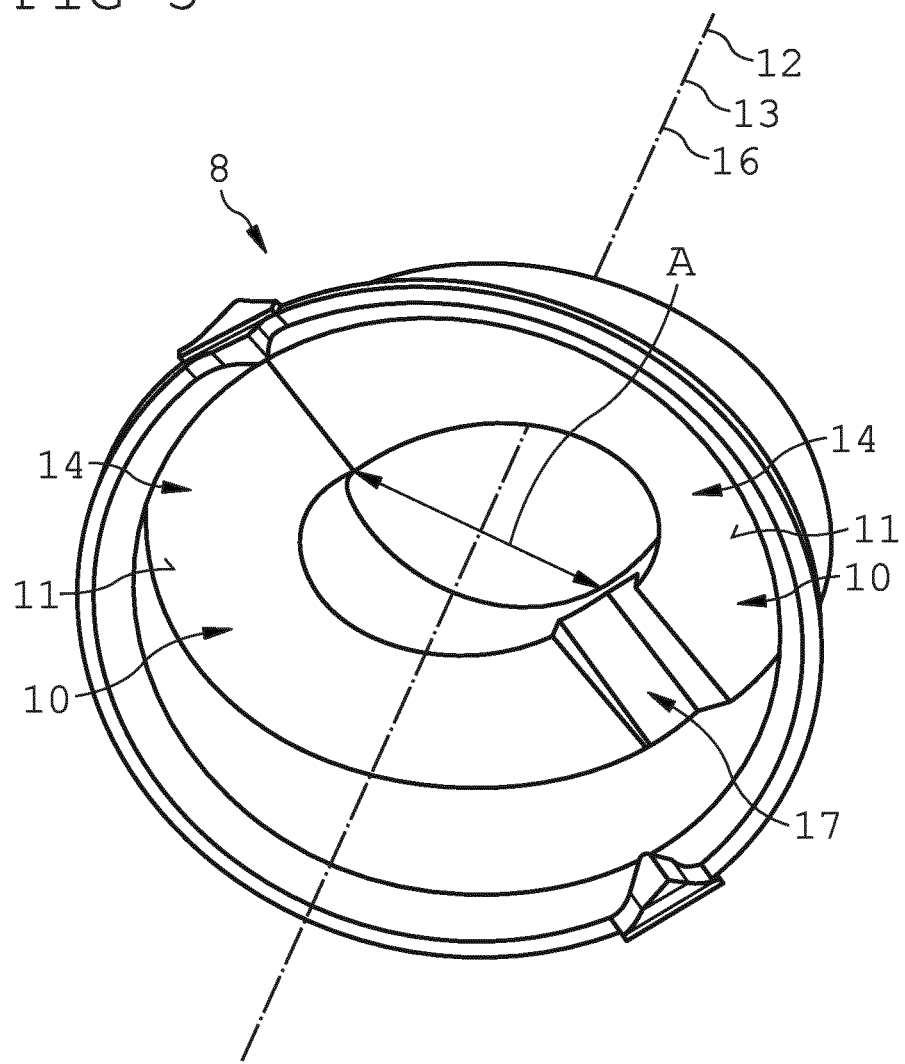
FIG. 3 is a schematic perspective view of the alignment member of the alignment device.

In order to illustrate the alignment member 8, a schematic perspective view of the alignment member 8 of the alignment device 1 is shown in FIG. 3. The guide track 10 comprises two guide track portions 14 which extend helically and in opposite directions around the longitudinal axis 13 of the alignment member 8. The alignment lug 15 of the alignment mating part 6 can be arranged in the recess 17 formed in the two guide track portions 14.

The invention claimed is:

1. An alignment device (1) for aligning a piece good part (4), which is received by a cable winch (2) of an aircraft (3), about a rotational axis (16) which is in parallel with a yaw axis (12) of the aircraft (3) when the alignment device (1) is used as intended, the alignment device (1) comprising:
an alignment member (8) which can be fastened on an underside (9) of the aircraft (3); and
an alignment mating part (6) which can be fixed to a piece good part (4), wherein, when the alignment device (1) is used as intended, the alignment mating part (6) has a single alignment lug (15) pointing in a direction of the aircraft (3),
wherein the alignment member (8) has a guide track (10),
wherein a sliding surface (11) of the guide track (10) is oriented in the direction of the alignment mating part (6),
wherein, when the alignment mating part (6) is displaced in the direction of the aircraft (3), the single alignment lug (15) of the alignment mating part (6) is brought into abutment with the sliding surface (11) through retraction of the cable winch (2) and, during further axial displacement of the alignment mating part (6) in the direction of the aircraft (3) along the rotational axis (16), through further retraction of the cable winch (2), the single alignment lug (15) slides along on the sliding surface (11) and brings about a rotation of the alignment mating part (6) about the rotational axis (16), such that the piece good part (4) is aligned relative to the aircraft (3) in exactly one orientation.

2. The alignment device (1) according to claim 1,
wherein the sliding surface (11) of the guide track (10) is designed such that it has a gradient angle, at least in portions,
wherein the gradient angle is defined as the angle between a normal axis perpendicular to the sliding surface (11) and the rotational axis (16).

3. The alignment device (1) according to claim 2,
wherein a progression of the gradient angle along the guide track (10) is continuous.

4. The alignment device (1) according to claim 1,
wherein the guide track (10) extends helically around a longitudinal axis (13) of the alignment member (8) which extends in parallel with the yaw axis (12) of the aircraft (3).

5. The alignment device (1) according to claim 4,
wherein the guide track (10) extends helically around the longitudinal axis (13) of the alignment member (8), about an angle of 360 degrees.

6. The alignment device (1) according to claim 4,
wherein the guide track (10) comprises two guide track portions (14),
wherein the two guide track portions (14) extend helically and in opposite directions 360° around the longitudinal axis (13) of the alignment member (8),
wherein the two guide track portions (14) are joined at a lower apex of the guide track (10), extend helically in opposite directions around the longitudinal axis (13) of the alignment member (8), and meet at an upper apex of the guide track (10).

7. The alignment device (1) according to claim 6,
wherein the single alignment lug (15) can be fixed, in a form-fitting manner, to the upper apex.

8. The alignment device (1) according to claim 7,
wherein the upper apex is a recess (17) within the guide track (10),
wherein the single alignment lug (15) is configured to be received within the recess (17).

9. The alignment device (1) according to claim 1,
wherein a lug surface of the single alignment lug (15) and/or of the sliding surface (11) comprises PTFE.

10. The alignment device (1) according to claim 1,
wherein the alignment mating part (6) comprises a fastening device (7) for fixing the alignment mating part (6) to the piece good part (4).

11. The alignment device (1) according to claim 1,
wherein the single alignment lug (15) is designed so as to protrude in a direction facing away from the piece good part (4).

12. The alignment device (1) according to claim 1,
wherein the cable winch (2) comprises a self-locking worm gear.

13. An alignment arrangement, comprising:
an aircraft (3);

a piece good arranged on a cable winch (2) of the aircraft (3); and the alignment device (1) according to claim 1, wherein an alignment mating part (6) of the alignment device (1), which is fixed to the piece good part (4), can be brought into engagement with an alignment member of the alignment device (1) arranged on the underside (9) of the aircraft (3), in case of a displacement of the piece good in the direction of the aircraft (3).

* * * * *